T. A. RICHARDS.
Machinery for Cutting Continuous Sheets of Rubber.
No. 198,684. Patented Dec. 25, 1877.
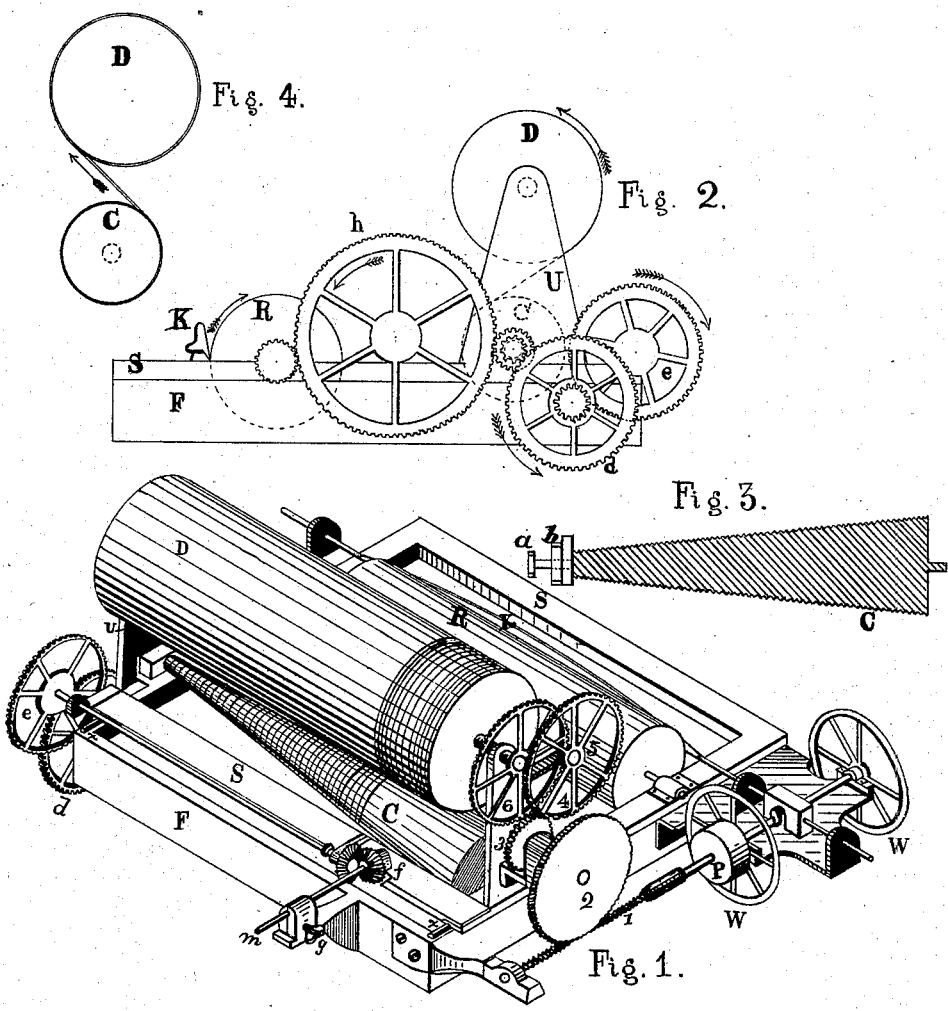

UNITED STATES PATENT OFFICE.

THERON A. RICHARDS, OF BROOKLYN, NEW YORK, ASSIGNOR TO CHARLES H. WIGHT, TRUSTEE, OF SAME PLACE.

IMPROVEMENT IN MACHINERY FOR CUTTING CONTINUOUS SHEETS OF RUBBER.

Specification forming part of Letters Patent No. 198,684, dated December 25, 1877; application filed August 22, 1876.

*To all whom it may concern:*

Be it known that I, THERON A. RICHARDS, of the city of Brooklyn, county of Kings, and State of New York, have invented a new and useful Machine for Producing Continuous Sheets of Rubber of any required thickness, which is fully set forth in the following specification, reference being had to the accompanying drawings, where—

Figure 1 is a perspective view of the machine. Fig. 2 is a side elevation of the same. Fig. 3 is a central longitudinal section of the cone C. Fig. 4 is an end view of the drawing-cylinder D, large end of cone C, and driving-wire U.

Continuous sheets of rubber have hitherto been made by calendering and rolling on sheets of cloth, for use in various branches of rubber manufacture.

In so making sheet-rubber by the calendering process great difficulty is experienced in obtaining sheets of any considerable thickness free from blisters and air-holes, and suitable for use.

While being calendered the rubber sheets are also in constant danger of being too highly heated, and injured in quality, or even of being burned and in part destroyed or rendered useless.

Sheets of rubber not continuous have been cut from thick slabs of prepared rubber by machinery.

My invention consists in the various matters set forth in the several clauses of claim annexed hereto.

I am aware that a cutter or vibrating knife has been used to cut a solid flat slab of rubber into separate sheets of the size of the slab.

My invention differs from this, in that the knife operates upon a cylinder of rubber, cutting around its circumference, and continuously therefrom as the roll of rubber diminishes in size until the whole is cut away by cuts equalized in breadth throughout, and the result is a continuous sheet of rubber or other like material of any desired and equal thickness throughout, without flaw, break, &c.; and it may also be adjusted so as to cut any required thickness of sheet.

The roll R, Figs. 1 and 2, represents the roll of rubber, which is formed on a proper shaft, so as to present a solid and compact mass of rubber around the shaft, free from blisters, bubbles of air, and other imperfections. The shaft of the roll R rests in bearings in the sliding frame S, and is operated by a train of spur-gear wheels, which receive their motion from the pinion $b$ on the shaft of the tapering barrel or cone C. The sliding frame S receives its motion to and from the knife K from another train of gear-wheels, &c., which will be described hereinafter.

The knife K is supported in fixed bearings secured in or on the fixed frame F, which constitutes the stationary part of the machine, on which the carriage S slides, and is made to move in short and rapid vibrations—say two thousand per minute, more or less—by the action of the short crank $c$ on the driving or pulley shaft. The roll R is advanced to the knife regularly as it diminishes in size, so as to enable the knife to remove continuously a given thickness of rubber therefrom until all the rubber has been cut away. The same object might be accomplished by the equivalent method of moving the knife with a regulated speed to and upon the roll R; but I prefer to move the rotating roll to the knife vibrating in fixed bearings. Great care and nicety are required in feeding the rotating roll R to the knife, the circumference of which moves at a varying speed, in order to secure a uniform thickness of the sheet throughout, since the roll is constantly diminishing in size, and requires, therefore, a constant regular increase of speed in the feeding and rotating of the roll R—as, for instance, a double speed where the circumferential surface has been reduced one-half, and corresponding variations between and beyond. To obtain this required and regulated increase of speed in the feeding of the roll R to the knife K automatically, I introduce into my machine the well-known device for obtaining a variable feed, to wit, the tapering barrel or cone, marked in the drawing C, and a wire or chain for operating the same from a cylinder or drum, D. The chain or wire is attached to the cone C at the small end, and wound around the same toward the large end far enough, and the chain is made long enough to be taken up from the cone only when the knife has traveled from the outside of the roll to the finish.

Between the sliding frame S, which carries the roll R and its train of rotating gear-wheels, and the pinion *a* which operates or feeds the sliding frame S, I interpose a train of gear-wheels, consisting of the wheel *d*, secured to the frame F and its pinion, the gear-wheel I and its shaft, attached to the sliding frame and operating the bevel-gears *f*, and feeding-screw *m*, which turns in the female screw *g* attached to the frame F, and consequently pushes the frame S toward the knife or draws it back therefrom.

Associated with the cone C is the cylindrical drum D, usually associated with the tapering barrel, to take up therefrom the chain or wire, and thereby cause the cone and attached mechanism to revolve or act.

The drum D transmits the actuating force applied in the machine to the cone C, and therefrom to the sliding frame, feeding-train, and to the rotating train, consisting of the spur-wheel *h* and the pinion *i* on the shaft of the roll R. This drum D receives its motion from the same shaft which drives the vibrating knife K, and therefore the speed of both is always in harmony. Motion is transmitted from the driving pulley and shaft throughout the train of wheels 2, 3, 4, 5, and 6, which are driven by the worm 1 on the driving-shaft, provided with the pulley P, to connect with a line of shafting and pulley outside of the machine by belt.

Suppose, now, the machine stands completely organized and ready to start, the gear-wheel No. 5 having twenty (20) teeth, and all arranged so as cut from the roll a sheet equal to fifty (50) per inch if the operation proceed. But it becomes desirable to cut the sheet of a double thickness, or equal to twenty-five (25) per inch. This I accomplish by simply removing the gear-wheel No. 5, substituting therefor a wheel having forty teeth, and operating the machine without any other change. This change doubles the speed of the drum D, the cone C, the feeding and rotating trains, and the sliding frame S, without any increase in the number of vibrations of the knife K. Consequently the roll R will move upon the knife K, and complete its movement in half the time occupied thereby when the gear-wheel No. 5 with twenty (20) teeth was retained, resulting in a sheet of one-half the length, but double the thickness previously cut or to be cut. Sheets of any other required thickness may be produced by alterations in the number of teeth in the wheel No. 5 upon the same principle, causing an increase or diminishment of the speed of the feeding and rotating movement of the roll R. The increased speed of the sliding-frame feed is accompanied by a like increase in the speed of the rotating trains and the revolving roll R.

The action of the knife on the rubber produces a rib across the entire sheet, resembling in appearance the mark left on the calendered sheet by the woof or filling-thread of the cloth on which it is formed and calendered.

Suppose, now, the machine to have the gear-wheel No. 5 with twenty (20) teeth in place, and the rest of the machine so organized as to make thirty-two (32) cuts of the knife for every inch of new surface across the roll R offered to it for action. The result will be thirty-two (32) ribs per inch across the rubber sheet.

When the change previously described from twenty (20) to forty (40) teeth on wheel No. 5 is made, the speed of rotation is doubled, as well as the speed of feed in the sliding frame S and roll R. Consequently the inch of the roll passes in half the time it previously did, receives half the cuts, and produces a sheet with half the number of ribs per inch. Therefore, to restore the number of ribs per inch to thirty-two (32) it is necessary to diminish the speed of the roll R without change in the feeding-speed of the slide-frame S. This I accomplish by doubling the number of teeth on the pinion *i*, which reduces the speed of the roll R by one half and restores the original relative speeds of the knife K and roll R, so as to produce the same number of ribs per inch on the thicker sheet of rubber. Thus, by keeping the number of teeth on the gear-wheel No. 5 and pinion *i* alike, the ribs may be kept the same in number per inch for any thickness; or they may be varied by varying the number of teeth on each, either to increase or to diminish the same.

It is evident that the driving-train of wheels placed between the worm 1 and the drum D may be varied in the number and relation of the wheels, so as to drive the drum. I contemplate such variation, and do not limit my invention to the precise arrangement shown. The same statements I apply to the feeding and rotating trains, which any mechanic can vary so as to still perform their respective functions in substantially the same manner.

I claim as my invention—

1. The combination of a vibrating knife, adapted to move across the face of a cylinder of rubber revolving with variable speed, with a suitable shaft or support for such cylinder, all substantially as and for the purpose set forth.

2. The combination of a vibrating knife, adapted to move across the face of a cylinder of material advanced to the knife at a variable speed, with a suitable shaft or support for the material, all substantially as and for the purpose set forth.

3. A vibrating knife adapted to move across the surface of a cylinder of rubber revolving with variable speed, and advanced to the knife at a variable speed, in combination with a suitable shaft or support for the cylinder, all substantially as and for the purpose set forth.

4. The vibrating knife K and the tapering barrel C and its wire U, in combination, the former being moved across the surface of a revolving cylinder of rubber for the purpose of cutting the same into a continuous sheet, and the latter operating the cylinder of rubber in its revolution by means of the wire or band U and suitable series of intermediate rotating devices, substantially as shown.

5. The vibrating knife K, the tapering barrel C and its wire or band U, and the feed-screw $m$, in combination, the knife being moved across the surface of a revolving cylinder of material for the purpose of cutting the same into a continuous sheet, the tapering barrel operating the cylinder in its revolution, and also the feed-screw in feeding the cylinder to the knife, each through a series of rotating devices, substantially as shown.

6. The vibrating knife K and the tapering barrel C, in combination, the knife being operated by a driving-shaft, which also, through suitable gearing, operates the tapering barrel and its connections, in the manner and for the several purposes set forth.

7. The tapering barrel C, in combination with the drum D, and connected by an operating band or wire, the drum D being connected to and operating the rotating and feeding devices, as shown and described, for the purpose of feeding a cylinder of material to a suitable cutting-knife, so that by the action of the knife the material shall be cut into a continuous sheet.

8. The sliding frame S, supporting and carrying to and fro with regulated speed the revolving cylinder of material R, the tapering barrel C, the drum D, and the connecting devices which revolve the cylinder and feed the frame to and fro, in the manner and for the purposes set forth.

9. The sliding frame S, carrying the revolving cylinder R, the tapering barrel C, the drum D, and their connecting devices, in combination with the fixed frame F, supporting the knife K and the driving-shaft, substantially as shown and described.

10. As an improved article of manufacture, a continuous sheet of rubber cut from a cylinder of solid rubber, and having the ribs formed by the action of the cutting-knife disposed across the sheet from side to side, and also of an equal distance apart throughout the sheet.

11. As an improved article of manufacture, a continuous sheet of rubber of equal thickness throughout, cut from a cylinder of solid rubber by cuts forming transverse ribs of equal distances apart throughout the sheet.

THERON A. RICHARDS.

Witnesses:
  WILLIAM HAAS,
  SPENCER H. COLE.